United States Patent [19]

Hashimoto et al.

[11] Patent Number: 5,717,004
[45] Date of Patent: Feb. 10, 1998

[54] ACTIVE ENERGY RAY-CURABLE COMPOSITION AND APPLICABLE METHOD

[75] Inventors: Yutaka Hashimoto, Sakai; Masanobu Yumoto, Izuminohtsu; Hiromu Chano, Osaka; Yutaka Kamada, Nishinomiya; Shigeo Kawaguchi, Osaka, all of Japan

[73] Assignees: Dainippon Ink & Chemicals, Inc., Tokyo; Yamamura Glass Co., Ltd., Nishinomiya, both of Japan

[21] Appl. No.: 751,476

[22] Filed: Nov. 18, 1996

Related U.S. Application Data

[63] Continuation of Ser. No. 320,977, Oct. 11, 1994, abandoned, which is a continuation of Ser. No. 634,917, Dec. 27, 1990, abandoned.

[30] Foreign Application Priority Data

Dec. 28, 1989 [JP] Japan ..................... 1-342450

[51] Int. Cl.$^6$ ..................... C08F 2/46
[52] U.S. Cl. ..................... 522/84; 427/487; 427/595
[58] Field of Search ............... 522/84; 427/487, 427/595

[56] References Cited

U.S. PATENT DOCUMENTS

| | | | |
|---|---|---|---|
| 4,125,503 | 11/1978 | McCarty et al. | 260/29.7 |
| 4,360,541 | 11/1982 | Costanza et al. | 427/54.1 |
| 4,380,604 | 4/1983 | Neuhaus et al. | 522/84 |
| 4,889,876 | 12/1989 | Yamamoto | 522/135 |
| 4,891,241 | 1/1990 | Hashimoto et al. | 427/54.1 |
| 4,961,976 | 10/1990 | Hashimoto et al. | 428/34.6 |
| 4,973,612 | 11/1990 | Cottington et al. | 522/84 |
| 5,183,832 | 2/1993 | Asmussen et al. | 522/84 |

FOREIGN PATENT DOCUMENTS 0 289 325  11/1988  European Pat. Off. .
WO81/02579  9/1981  WIPO .

*Primary Examiner*—Mark Chapman
*Attorney, Agent, or Firm*—Armstrong, Westerman Hattori, McLeland & Naughton

[57] ABSTRACT

The composition of the present invention is curable by active energy ray. It is a mixture including a coupling agent, an active energy ray-curable compound and water. A glass article will show improved mechanical strength if it is coated with the composition of the present invention and irradiated with active energy ray to cure the coating.

9 Claims, No Drawings

ACTIVE ENERGY RAY-CURABLE COMPOSITION AND APPLICABLE METHOD

This application is continuation of application Ser. No. 08/320,977 filed Oct. 11, 1994, abandoned, which is a continuation of Ser. No. 07/634,917, filed Dec. 27, 1990, abandoned.

BACKGROUND OF THE INVENTION

1. Field of the Invention

This invention relates to an active energy ray-curable composition and a method for using the same to enhance the mechanical strength of glass.

2. Prior Art

Two methods to enhance the mechanical strength of glass containers are disclosed by Unexamined Japanese Patent Publication No. 1-201047; (1) A glass surface is treated with a silane coupling agent, coated with a curable composition containing one or more types of curable compounds that have, in their molecular structure, two or more acryloyl groups selected from a fluoroacryloyl, methacyloyol or acryloyl group, and cured with active energy ray, and (2) A glass surface is coated with the aforementioned curable composition containing a silane coupling agent and is then cured with active energy ray. In the following description, acryloyl, methacryloyl and fluoroacryloyl are referred to as (meth)acryloyl, and acrylate, methacrylate and fluoroacrylate are referred to as (meth)acrylate.

Method (1), which has one more processing step, offers less productivity than Method (2). On the other hand, the active energy ray-curable composition of Method (2), consisting of an active energy ray-curable compound, a silane coupling agent and an organic solvent, is unstable; as a result, in that the maximum original strength rendered by the fresh composition can hardly be expected from a composition stored for a long time, or the composition can be expected to only slightly improve the mechanical strength of the glass container over which it is spread when it is used after being after being stored for a long time.

The applicants of the present invention have investigated how to develop a curable composition which enhances the mechanical strength of a glass container, even after being stored for a long time, to the maximum extent that a fresh composition does, and have found that the curable composition of Method (2) can have unexpectedly high storage stability when mixed with water. In such a way the mechanical strength of the glass container can be guaranteed to the same extent as when using a fresh composition, even if the composition has been stored for a long time.

SUMMARY OF THE PRESENT INVENTION

The present invention provides an active energy ray-curable composition, which is characterized by containing a coupling agent, an active energy ray-curable compound and water.

The present invention's composition, which is curable by active energy ray, has sufficiently high storage stability to impart the maximum mechanical strength to the glass container it is protecting (just as a fresh one does), even after being stored for a long time. Furthermore, the glass container reinforced with a fresh composition of the present invention has a higher mechanical strength than one reinforced with a conventional fresh composition.

The present invention also provides a method for enhancing the mechanical strength of a glass container, characterized by that a composition, which is curable by a high-energy composition, containing a coupling agent, an active energy ray-curable compound and water is spread over a glass container, and then Is cured with active energy ray.

DETAILED DESCRIPTION OF THE PREFERRED EMBODIMENTS

The present invention's compound, which is curable by active energy ray is hereinafter referred to as CURABLE COMPOUND, and the active energy ray-curable composition is referred to as CURABLE COMPOSITION, unless otherwise stated.

The CURABLE COMPOSITION of the present invention is prepared by mixing (I) coupling agent, (II) one or more CURABLE COMPOUNDS, and (III) water, in a proper ratio. The mixing order is not restricted; component (II) may be added to an aqueous solution of components (I) and (III), or component (III) may be added to a mixture of components (I) and (II). An organic solvent may be used, as necessary, to facilitate the mixing.

The mixing ratio of components (I), (II) and (III) is not restricted.

The preferred concentration of the component (I) in the CURABLE COMPOSITION is in a range of from 0.01 to 30 parts by weight per 100 parts by weight of components (I), (II) and (III), preferably with in a range of 0.01 to 10 parts by weight, from the viewpoint of the mechanical strength of the glass container it reinforces and economic efficiency.

The concentration of component (III) in the CURABLE COMPOSITION is normally within a range of from 0.5 to 80 parts by weight per 100 parts by weight of components (I), (II) and (III) preferably within a range of 0.5 to 50 parts by weight.

The concentration of components (II) in the CURABLE COMPOSITION will be determined from the concentrations of components (I) and (III).

The coupling agent (I) for the present invention is an organic compound with two or more different reactive groups in its molecular structure, such as silane, titanium, aluminum, zirconium and zirconium/aluminum coupling agents, of which the silane coupling agent is the most preferable.

In the present invention, two or more coupling agents may be used as the coupling agent (I) described below.

The silane coupling agent useful for the present invention is an organic silicon monomer with at least two different reactive groups, one of the reactive groups being capable of reacting with glass, and the other being capable of reacting with the (meth)acryloyl group. Such an agent is represented by the following general formula:

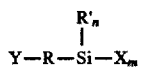

where Y is an acryloyl, methacryloyl,fluoroacryloyl,vinyl, amino, mercapto, oxyglycidyl or isocyanate group, or a halogen atom. R is a branched or unbranched alkylene group, R' is a branched or unbranched alkyl group, X is a hydroxyl or alkoxyl group, or halogen atom, n is an integer of 0 or 1, and m is an integer of 3-n, or is represented by the following general formula:

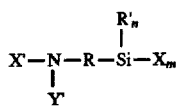

where X' and Y' may be the same or different, selected from a group consisting of aminoalkyl, acryloyl, methacryloyl, fluoroacryloyl, hydroxyl, glycidyl, aryl, trialkoxysilylalkyl and dialkoxyalkyosilylalkyl groups, and R', n and m are defined above.

More concretely, the silane coupling agents useful for the present invention include, but are not limited, to the following compounds:

$CH_2=CHSiCl_3$  (I)-1

$CH_2=CHSi(OCH_3)_3$  (I)-2

$CH_2=CHSi(OC_2H_5)_3$  (I)-3

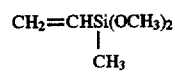  (I)-4

$CH_2=CHSi(OCH_2CH_2OCH_3)_3$  (I)-5

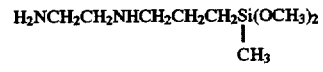  (I)-6

$H_2NCH_2CH_2NHCH_2CH_2CH_2Si(OCH_3)_3$  (I)-7

$H_2NCH_2CH_2CH_2Si(OC_2H_5)_3$  (I)-8

$CH_2=CHCH_2NHC_2H_4NHC_3H_6Si(OCH_3)_3$  (I)-9

$CH_2=CHCH_2NHC_3H_6Si(OCH_3)_3$  (I)-10

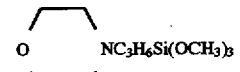  (I)-11

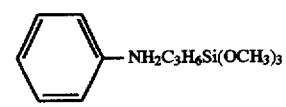  (I)-12

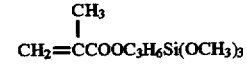  (I)-13

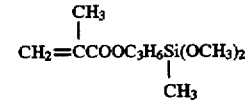  (I)-14

$CH_2=CHCOOC_3H_6Si(OCH_3)_3$  (I)-15

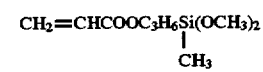  (I)-16

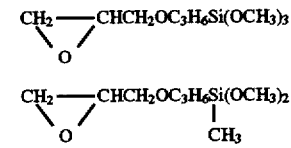  (I)-17

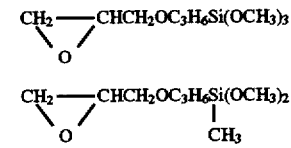  (I)-18

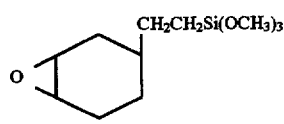  (I)-19

  (I)-20

$ClCH_2CH_2CH_2Si(OCH_3)_3$  (I)-21

$HSCH_2CH_2CH_2Si(OCH_3)_3$  (I)-22

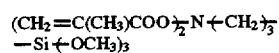  (I)-23

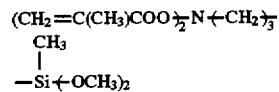  (I)-24

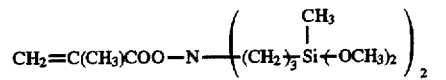  (I)-25

Each of the above compounds may be hydrolyzed, by a method known to those skilled in the art, to convert an alkoxyl group totally or partly into a silanol group. Such a compound also falls under the silane coupling agent for the present invention.

The titanium coupling agent useful for the present invention includes, but is not limited to, the following compounds:

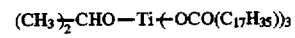  (I)-26

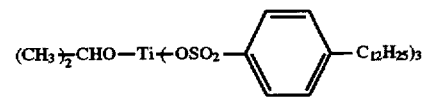  (I)-27

  (I)-28

  (I)-29

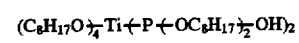  (I)-30

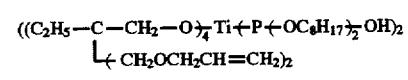  (I)-31

  (I)-32

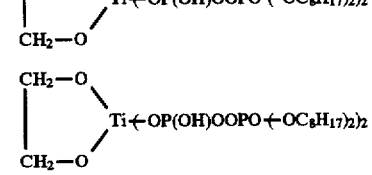  (I)-33

It is to be understood that the above list of the compounds is for illustration, but is by no means limiting for the present invention.

The active energy ray-curable compound (II) of the present invention is a compound which can be cured by active energy ray into a resinous material, and includes, but is not limited to, those contained in the fluoroacryloyl, methacryloyl and acryloyl groups. Such a compound is hereinafter referred to as acrylate. It is understood that the above statement by no means limits the use of any active energy ray-curable compound, so long as it is known to those skilled in the art. The acryloyl, methacryloyl and fluoroacryloyl groups are hereinafter referred to as the acryloyl-base group, and (meth)acrylic acid refers to acrylic acid, methacrylic acid or a combination thereof, unless otherwise stated.

CURABLE COMPOUNDS (II) for the present invention include those known by skilled persons as multifunctional (meth) acrylate, prepolymer, base resin and oligomer or acryloligomer. More concretely, it includes:

(II)-(i) multi-valent (meth) acrylate in which two or more α-fluoroacrylic acid or (meth) acrylic acids are bonded to a multi-valent alcohol (II)-(ii) polyester acrylate in which two or more α-fluoroacrylic acid or (meth) acrylic acid are bonded to a polyester polyol produced by the reaction between the multi-valent alcohol and the polybasic acid The multi-valent alcohol for the compounds (i) and (ii) above includes: ethylene glycol, 1,4-butanediol, 1,6-hexadiol, diethylene glycol, trimethylol propane, dipropylene glycol, polyethylene glycol, polypropylene glycol, pentaerythritol, dipentaerythritol and bisphenol A, and

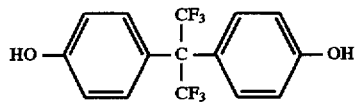

The multi-valent alcohol also includes modified alcohol, which is produced by adding ethylene or propylene oxide to the aforementioned alcohol. The polybasic acid includes phthalic, adipic, maleic, trimellitic, itaconic, succinic, terephthalic and alkenyl succinic acids.

(II)-(iii) epoxy-modified acrylate in which the epoxy groups in an epoxy compound with at least two epoxy groups are esterified by α-fluoro-acrylic acid or (meth) acrylic acid to form the acryloyl-base group.

The epoxy compounds with at least two epoxy groups in the molecular structure include: bisphenol A - epichlorohydrin resin, phenol novolac-epichlorohydrin resin and multi-valent alcohol epichlorohydrin type alicyclicresin.

(II)-(iv) polyurethane acrylate produced by reacting α-fluoroacrylate (meth) acrylate containing hydroxyl groups with multi-valent isocyanate The multi-valent isocyanate compounds include those with a polyester, polyether or polyurethane structure at the molecular center and isocyanate groups at either terminal.

(II)-(v) other compounds, such as polyether, (meth) acrylate, polyether α-fluoroacrylate, melamine (meth) acrylate, melamine α-fluoroacrylate, alkyd (meth) acrylate, alkyd α-fluoroacrylate, isocyanurate (meth) acrylate, isocyanurate α-fluoroacrylate, silicon (meth) acrylate and silicon α-fluoroacrylate (II)-(vi) compounds containing one acryloyl-base group in their molecular structure Among CURABLE COMPOUNDS with at least two acryloyl-base groups in the aforementioned molecules, those preferable ones from the viewpoint of their ability to efficiently enhance resistance to pressure and impact of the glass containers being reinforced are listed below:

The compound represented by general formula (a):

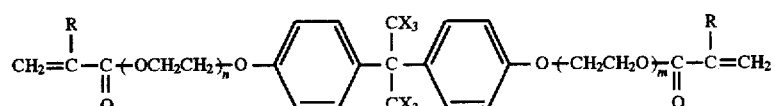

where R is H, F or CH$_3$, n and m are the same or different integers satisfying the relationship of 2≦n m≦10, and X is H or F.

The reactive compound represented by general formula (b):

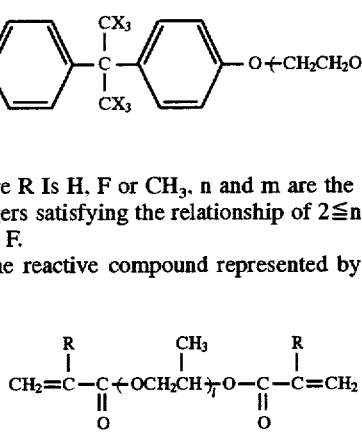

where, l is an integer of from 1 to 10, inclusive, and R is defined above.

The compound represented by general formula (c):

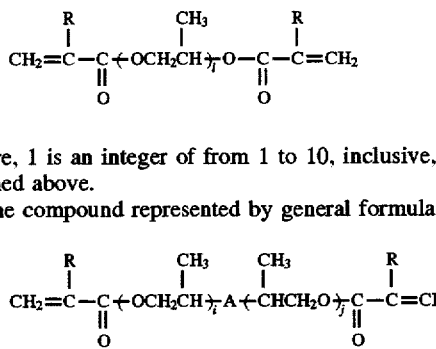

The compound represented by general formula (d):

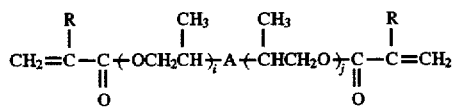

The compound represented by general formula (e):

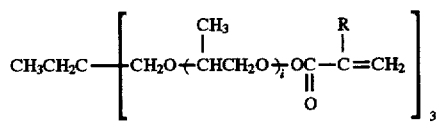

The compound represented by general formula (f):

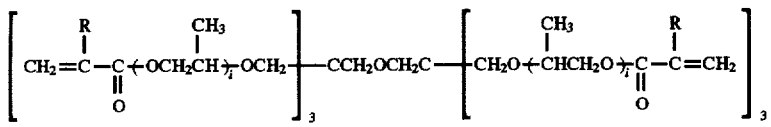

where A is represented by a general formula

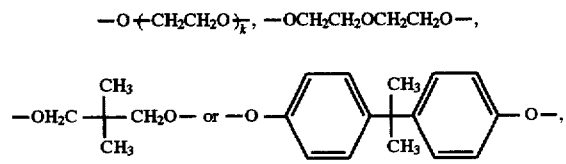

l, j and k are integers from 1 to 10, inclusive, and R is defined above.

The compound represented by general formula (g):

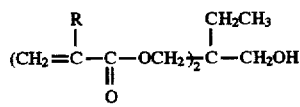

The compound represented by general formula (h):

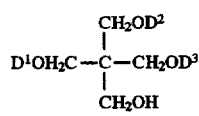

where $D^1$ through $D^3$ are hydrogen atoms, α-fluoroacryloyl group or (meth) acryloyl groups, and at least two of $D^1$ through $D^3$ are α-fluoroacryloyl or (meth) acryloyl groups.

The compound represented by general formula (i):

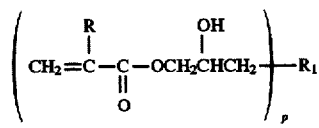

where R is as defined above, p is an integer from 2 to 5, inclusive, and $R_1$ is from either the aliphatic or aromatic groups.

The compound represented by general formula (j):

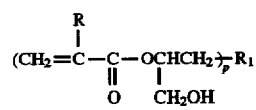

where R, p and $R_1$ are as defined above.

More concretely, the compounds falling under CURABLE COMPOUNDS are listed below;

(II)-1 ethyleneglycol di(meth)acrylate
(II)-2 diethyleneglycol di(meth)acrylate
(II)-3 triethyleneglycol di(meth)acrylate
(II)-4 polyethyleneglycol di(meth)acrylate (number average molecular weight: 150 to 1000)
(II)-5 propyleneglycol di(meth)acrylate
(II)-6 dipropyleneglycol di(meth)acrylate
(II)-7 tripropyleneglycol di(meth)acrylate
(II)-8 polypropyleneglycol di(meth)acrylate (number average molecular weight: 250 to 1000)
(II)-9 neopentylglycol di(meth)acrylate
(II)-10 1,3 butanediol di(meth)acrylate
(II)-11 1,4 butanediol di(meth)acrylate
(II)-12 1,6 hexanediol di(meth)acrylate
(II)-13 hydroxy ester neopentyl di(meth)acrylate
(II)-14 The compound represented by the following general formula:

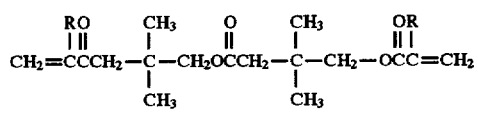

(where R is H or $CH_3$.)

(II)-15 The compound represented by the following general formula:

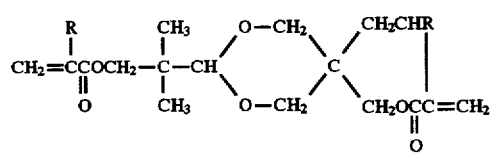

(where R is H or $CH_3$.)

(II)-16 bisphenol A di(meth)acrylate
(II)-17 trimethylol propane tri(meth)acrylate
(II)-18 pentaerithritol tri(meth)acrylate
(II)-19 dipentaerithritol hexa(meth)acrylate
(II)-20 pentaerithritol tetra(meth)acrylate
(II)-21 trimethylol propane di(meth)acrylate
(II)-22 dipentaerithritol menohydroxy penta(meth)acrylate
(II)-23 neopentylglycol diacrylate modified with polypropyleneglycol
(II)-24 bisphenol A diacrylate modified with polyethyleneglycol
(II)-25 trimethylol propane triacrylate modified with polypropyleneglycol
(II)-26 trimethylol propane triacrylate modified with polyethyleneglycol
(II)-27 dipentaerythritol hexaacrylate
(II)-28 tris (2-acryloxy) isocyanurate
(II)-28 tris (2-acryloxy) isocyanurate
(II)-29 The compound represented by the following general formula:

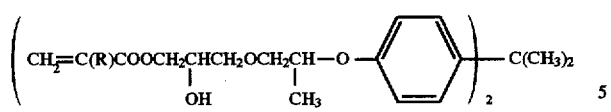

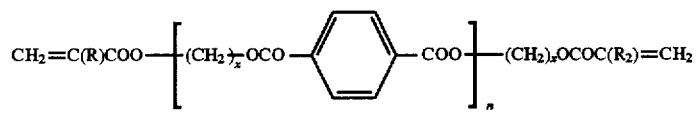

(where n and x are integers from 1 to 10, inclusive.)

(II)-31 The compound represented by the following formula:

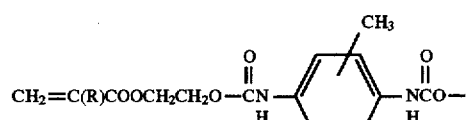

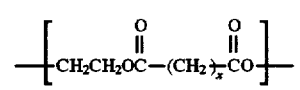

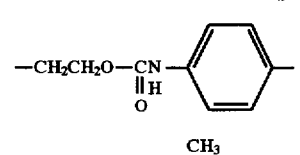

(II)-30 The compound represented by the following general formula:

-continued
—NCOCH$_2$CH$_2$OCOC(R)=CH$_2$
H‖
O (where n and x are integers from 1 to 10, inclusive, and R is H or —CH$_3$.)

(II)-32 polyethyleneglycol 400 dimethaacrylate
(II)-33 1,3-bis (3'-acryloxyethoxy-2'-hydroxypropyl) 5,5-dimethyl hydantoins (II)-34 (CH$_2$=C(R)COOCH$_2$CH$_2$O)$_2$P—OH (II)-35 (CH$_2$=C(R)COOCH$_2$CH$_2$O)$_3$P=O (where R is H or —CH3)

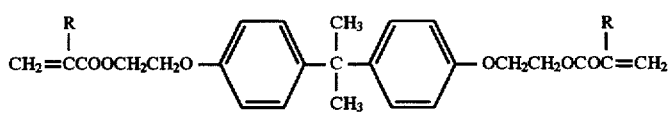

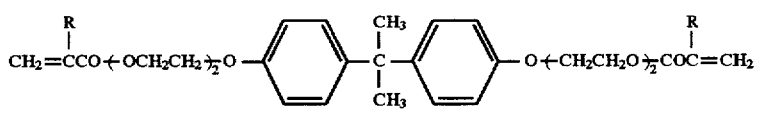

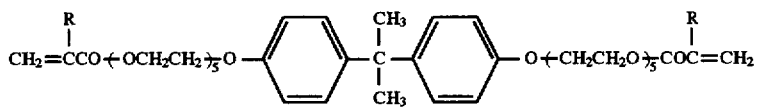

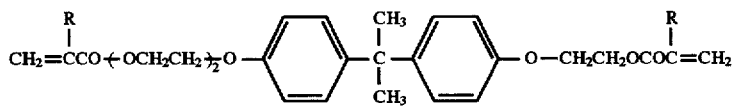

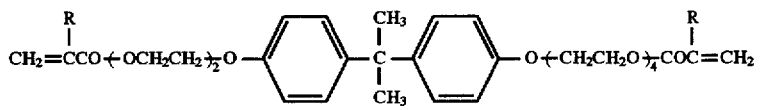

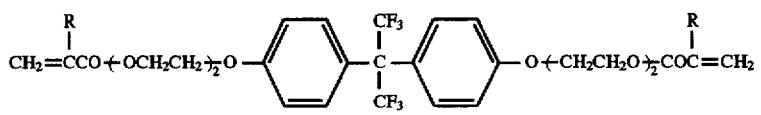

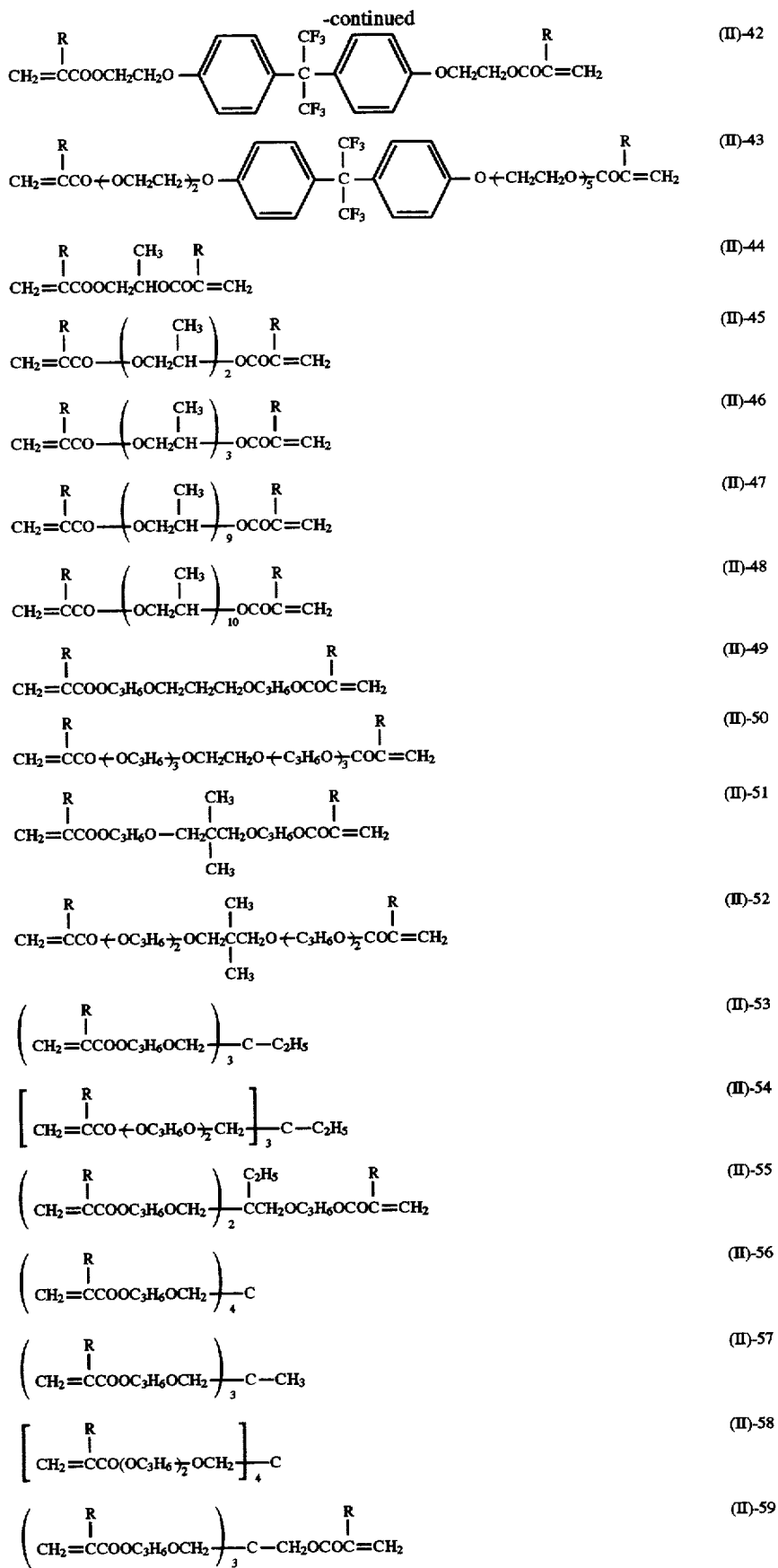

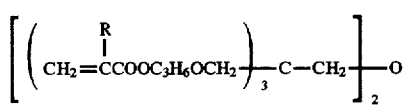 (II)-60
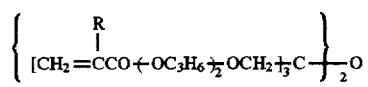 (II)-61
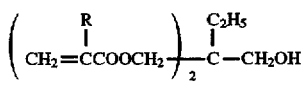 (II)-62
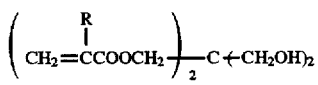 (II)-63
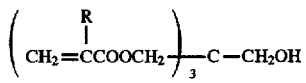 (II)-64
(II)-65 dipentaerythritol diacrylate
(II)-66 dipentaerythritol triacrylate
(II)-67 dipentaerythritol tetraacrylate
(II)-68 dipentaerythritol pentaacrylate
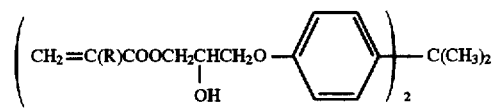 (II)-69
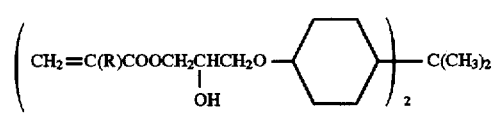 (II)-70
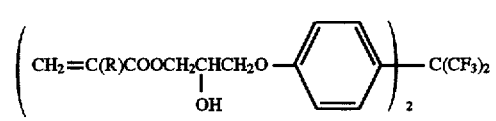 (II)-71
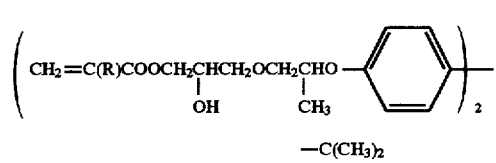 (II)-72
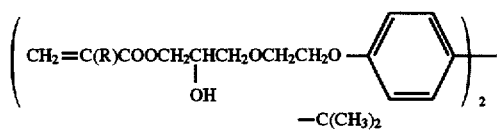 (II)-73
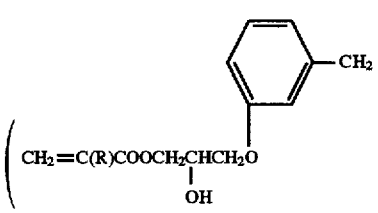 (II)-74
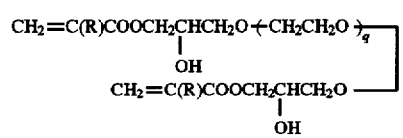 (II)-75
(where q is interger from 1 to 10.)
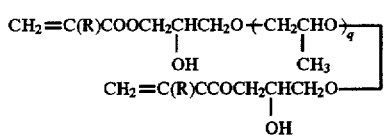 (II)-76
(where q is interger from 1 to 10.)
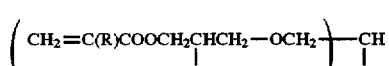 (II)-77
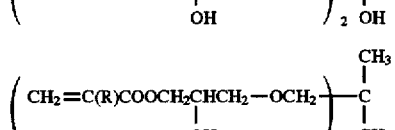 (II)-78
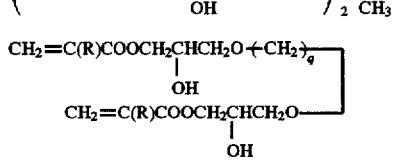 (II)-79
(where q is interger 2 to 9.)
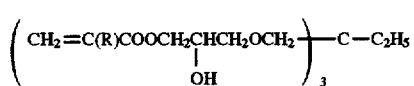 (II)-80
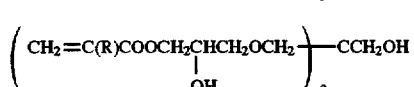 (II)-81
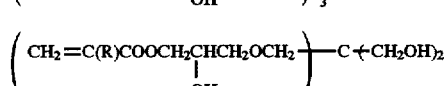 (II)-82
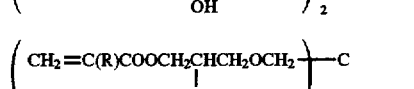 (II)-83
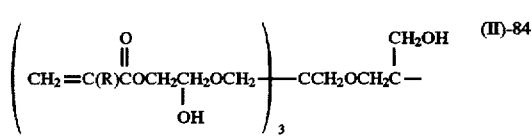 (II)-84

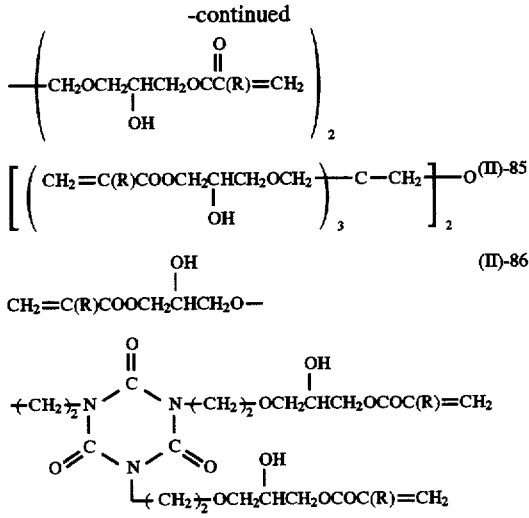

(II)-87 The compound represented by the following general formula:

$$CH_2=C(R)COOCH_2CHCH_2OOC(R)C=CH_2$$
(with OH on the middle carbon)

(where R is H, F or CH$_3$.)

CURABLE COMPOUNDS with one acryloyl-base group in the molecular structure are listed below:

(II)-88 (meth)acrylic acid
(II)-89 (meth)acrylic acid alkyl (C$_1$ to C$_{18}$)
(II)-90 phenoxyethyl (meth)acrylate
(II)-91 ethoxyethyl (meth)acrylate
(II)-92 methoxyethyl (meth)acrylate
(II)-93 butoxyethyl (meth)acrylate
(II)-94 N, X-diethylaminoethyl (meth)acrylate
(II)-95 N, X-dimethylaminoethyl (meth)acrylate
(II)-96 glycidyl (meth)acrylate
(II)-97 allyl (meth)acrylate
(II)-98 2-hydroxyethyl (meth)acrylate
(II)-99 2-hydroxypropyl (meth)acrylate
(II)-100 2-methoxyethoxyethyl (meth)acrylate
(II)-101 2-ethoxyethoxyethyl (meth)acrylate
(II)-102 benzyl (meth)acrylate
(II)-103 cyclohexyl (meth)acrylate
(II)-104 dicyclopentenyl (meth)acrylate
(II)-105 dicyclopentenyloxyethyl (meth)acrylate
(II)-106 2-hydroxyethyl (meth)acryloyl phosphate
(II)-107 tetrahydrofurfuryl (meth)acrylate
(II)-108 dicyclopentadienylyl (meth)acrylate
(II)-109 dicyclopentadieneethoxy (meth)acrylate
(II)-110 p-benzylphenoxyethyl (meth)acrylate
(II)-111 1,6-hexanediolmono (meth)acrylate
(II)-112 neopentylglycolmono (meth)acrylate
(II)-113 glycerinmono (meth)acrylate
(II)-114 trimethylolpropane mono (meth)acrylate
(II)-115 pentaerythritol mono (meth)acrylate
(II)-116 2-hydroxy-3-phenyloxypropyl (meth)acrylate
(II)-117 2-hydroxy-3-octyloxypropyl (meth)acrylate
(II)-118 diethylene glycol mono (meth)acrylate
(II)-119 polyethylene glycol (400) mono (meth)acrylate
(II)-120 2-(perfluorooctyl) ethyl (meth)acrylate
(II)-121 isobornyl (meth)acrylate
(II)-122 dicyclopentanyl (meth)acrylate
(II)-123 phenyl (meth)acrylate (II)-124 The compound represented by the following general formula:

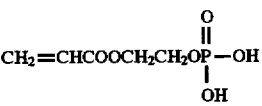

(II)-125 isooctyl (meth)acrylate

All the examples (II)-69 through (II)-87 are epoxy-modified (meth) acrylates of the α-adducts, but one should understand that the β-adducts also fall into the category of (II)-(iii) of CURABLE COMPOUNDS of the present invention. The examples (II)-1 through (II)-125 are those containing an acryloyl or methacryloyl group as designated by (meth)acryloyl, but those containing fluoroacryloyl groups also fall under these categories. One should also understand that the CURABLE COMPOUNDS (II) of the present invention are not limited by the above examples.

In the present invention the monofunctional or difunctional monomer that constitutes the active energy ray-curable compound is not limited in concentration, i.e., its concentration can be varied within a range of 100:0 to 0:100. With ultraviolet rays as the active energy ray, however, its concentration should preferably be within a range of 98:2 to 0:100, to maximize the curability and toughness of the curable film.

The CURABLE COMPOUND of the present invention may contain only one acryloyl-base group in the molecular structure, such as those that fall into the categories of (II)-88 through (II)-124; however, preferably, it should contain two or more acryloyl groups, such as those in (II)-1 through (II)-87.

Combining one CURABLE COMPOUND containing one acryloyl-base group in the molecular structure with another CURABLE COMPOUND containing two or more acryloyl-base groups will improve controllability over the viscosity and reactivity of the final composition as well as the hardness of the cured film.

The water used for the present invention should preferably be processed water, such as distilled or ion-exchanged water.

An organic solvent may be used for a CURABLE COMPOUND in the present invention, in order to improve the controllability over the viscosity, coatability and film thickness. The type of organic solvent is not restricted, so long as it does not harmfully affect the polymerization reactivity of a CURABLE COMPOUND in the present invention. Solvents which are preferable from the viewpoint of operability are low-boiling solvents, such as methanol, ethanol, isopropylalcohol, butnanol, acetone, methylethylketone, methylisobutylketone, diethyl ether, tetrahydrofuran, methyl acetate, ethyl acetate, butyl acetate, n-hexane, toluene, chloroform, dichloroethane, carbon tetrachloride, and 1-fluoro-dichloro-2-difluoro-2-chloroethane. Of these, those capable of dissolving the coupling agent (I) in water are particularly preferable.

In accordance with the knowledge of the applicants of the present invention, the glass container can be naturally increased in mechanical strength when coated with a CURABLE COMPOSITION consisting of components (I), (II) and (III). It is, however, preferable that the CURABLE COMPOSITION have an acid number of 0.01 to 100 when the glass container reinforced with a CURABLE COMPOSITION is to be exposed to severe environments, such as hot water and/or alkaline hot water. An acid number within this range will improve the adhesiveness of the coating to the glass surface and the resistance of the coating to pressure and impacts.

The acid number used in this specification is defined as the weight of potassium hydroxide (mg) necessary for neutralizing the acidic materials contained in 1 g of the CURABLE COMPOSITION.

Any acid, alkali or buffer solution may be used to adjust the acid number of the CURABLE COMPOSITION; an acid group bonded to CURABLE COMPOUND (II), α-fluoroacrylic acid or (meth)acrylic acid as a decomposition product therefrom, and a newly added organic or mineral acid represent only some examples.

Acid components useful for the present invention include: a compound in which succinic or phthalic acid anhydride is added to a CURABLE COMPOUND (g) to (i), which has one or more hydroxyl groups in the molecular structure, a CURABLE COMPOUND falling under the category (II)-88 or (II)-124, and a compound represented by the following formula:

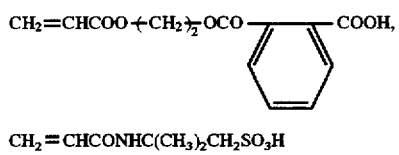

$CH_2=CHCONHC(CH_3)_2CH_2SO_3H$

In addition to the above, the following compounds are also useful: acetic acid, aliphatic acid having an alkyl group with a carbon number from 2 to 18, inclusive, methane sulfonic acid, alkyl sulfonic acid with an alkyl group with a carbon number from 2 to 18, inclusive, trifluoromethane sulfonic acid, p-toluene sulfonic acid, benzoic acid, phthalic acid, formic acid, lactic acid, cinnamic acid, chloric acid, sulfuric acid, nitric acid, and perchloric acid. Alkaline compounds useful for the present invention include amines, lithium hydroxide, potassium hydroxide and sodium hydroxide.

In accordance with the knowledge of the applicants of the present invention, it is preferable to add a leveling or surface-active agent to the CURABLE COMPOSITION of the present invention to coat the glass container evenly. Leveling or surface-active agents useful for the present invention include hydrocarbon-, silicone- and fluorine-base agents. In particular, an oil-soluble, fluorine-base surface active agent (IV) is preferable for efficiently improving the resistance of the coated glass container to pressure and impact.

The aforementioned oil-soluble, fluorine-base surface-active agent (IV) useful for the present invention is a compound which has one or more fluorine-base aliphatic groups with a carbon number from 1 to 20, inclusive, and which has a solubility of 0.1 weight % or more in an organic solvent at 25° C. An example of this organic solvent is that mentioned earlier, which is used for controlling the viscosity and coatability of a CURABLE COMPOSITION and the thickness of the coating film.

The two representative types of the aforementioned oil-soluble, fluorine-base surface-active agent (IV) are listed below:

(1) A compound in which the fluorine-base aliphatic group is bonded to a polar group via a divalent coupling group, such as (IV)-1 the compound represented by the following formula:

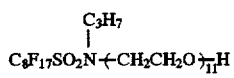

(IV)-2 the compound represented by the following formula:

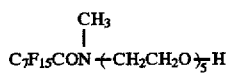

(IV)-3 the compound represented by the following formula:

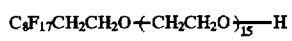

(IV)-4 the compound represented by the following formula:

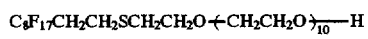

(2) The compound in which a fluorine-base aliphatic group is introduced as a branch chain into the polymer structure. Some of these fluorine-containing polymers are commercially available, such as the fluorine-base surface-active agents Megafac F-177, F-173, F-172, F-171 and F-184; the surface-modifying agents Defensa MCF-300, MCF-312 and MCF-323, and the solvent type water/oil repellants Dicguard F-320 and F-327, are all supplied by Dai-Nippon Ink Co., Ltd. Furthermore, fluorine-containing polymers of various molecular structures may be synthesized for the present invention,to satisfy specific needs. One example is a fluorinated methacrylate copolymer containing a fluorinated aliphatic group with a carbon number from 1 to 20 inclusive and the above compound, a monofunctional monomer which contains one methacryloyl group. Some concrete examples of such compounds are listed below:

(IV)-5 a copolymer of the compound represented by the following formula;

and methyl methacrylate in a molar ratio of 1:5 (average molecular weight: 20,000)

(IV)-6 a copolymer of the mixture represented by the following formula; $C_nF_{2n+1}CH_2CH_2OCOCH=CH_2$ (n=1 to 16, average molecular weight: 520) and a methyl methacrylate macromer (average molecular weight: approximately 5,000) in a molar ratio of 3:1 (average molecular weight: 40,000)

(IV)-7 polyurethane (average molecular weight: 5,900) of a compound represented by the formula; $C_{10}F_{21}CH_2CH_2OH$ polypropylene glycol (molecular weight:5000) and tolylenediisocyanate in a molar ration of 2:1:2.

(IV)-8 polyester (average molecular weight: 4,700) of a compound represented by the formula; $C_8F_{17}SO_2N(CH_2CH_2OH)_2$ polyethylene glycol and adipic acid in a molar ratio of 1:3:4.

The CURABLE COMPOSITION of the present invention is spread on, or impregnated in the glass, which may be either pretreated with a silane coupling agent or untreated. It is then polymerization-cured with active energy ray or under heat, to form the desired type of coating film.

The active energy ray useful for the present invention includes: microwaves, far-infrared rays, infrared rays, visible light, ultraviolet rays, electron beams, and radioactive rays such as β or γ rays.

The active energy ray-curable composition of the present invention will naturally be one curable by an electron beam when the CURABLE COMPOUND (II) is cured by an electron beam, and one curable by ultraviolet rays, when the CURABLE COMPOUND (II) is one cured by ultraviolet rays.

When using ultraviolet rays as the active energy ray form, the so-called photopolymerization initiator, which is known to those skilled in the art, may be used. Initiator (V) which are useful for the present invention include: (V)-1: benzophenone, (V)-2: acetophenone, (V)-3: benzoin, (V)-4: benzoin ethyl ether, (V)-5: benzoin isobutyl ether, (V)-6: benzyl methyl ketal, (V)-7: azobisisobutylonitrile, (V)-8: 1-hydroxycyclohexylphenylketone, and (V)-9: 2-hydroxy-2-methyl-1-phenylpropane-1-on. Moreover, an amine or phosphor compound such as the photoinitiator may be used, as required, to further accelerate the polymerization. Such an initiator may not be needed when electron or radioactive rays are used as the active energy ray form.

Furthermore, in a CURABLE COMPOSITION of the present invention, an organic metallic compound, which acts as a catalyst for the coupling agent (I) may be used as required. Such metallic compounds include: salt, organic zinc, tin and platinum compounds. The salts useful for the present invention include: ammonium chloride, ammonium perchloric acid, sodium carbonate, sodium bicarbonate, and sodium biphosphate. The organic zinc compounds useful for the present invention include:

The compound represented by the following general formula:

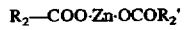

$R_2$—COO-Zn-OCOR$_2$'

(where $R_2$ and $R_2$' (which may be the same or different) are hydrogen atoms, from a branched or unbranched alkyl group.)

The compound represented by the following general formula:

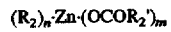

$(R_2)_n$-Zn-(OCOR$_2$')$_m$ (where $R_2$ and $R_2$' are as defined above, and n is 1 to 4 and m is 4 to n)

The organic tin compound useful for the present invention includes:

The compound represented by the following general formula:

$R_2$—COO-Sn-OCOR$_2$'

(where $R_2$ and $R_2$' are as defined above.)

The compound represented by the following general formula:

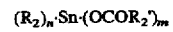

$(R_2)_n$-Sn-(OCOR$_2$')$_m$ (where $R_2$, $R_2$', m and n are as defined above.)

More concrete examples of the organic metallic compounds are zinc octylate, tin octylate, dibutyl tin diacetate, dibutyl tin dioctate and dibutyl tin dilaurate.

Glass used in the present invention covers all types of glass materials, including general oxide glass, non-oxide glass and functional glass, called new glass, and others. Of these, oxide glass is the most important, in terms of the adhesiveness of the coating to the glass surface, as well as the marketability and practicality of the reinforced glass articles. The shape of the reinforced glass articles is not restricted, but containers are more important in terms of market values.

The various types of coating methods known to those skilled in the art may be used to coat glass with a CURABLE COMPOSITION in the present invention. Such coating methods include: brushing, aided by an applicator, barcoater, roll brush or roll coater; spray coating aided by an air spray or airless spray coater; flow coating aided by a shower or curtain flow coater; dipping; and spinner coating. The method should be selected according to the shape or specific purpose of the glass article to be reinforced.

In the present invention, the thickness of the cured resinous coating film is not restricted, so long as the reinforcing effects are efficiently realized, when the mechanical strength such as the pressure resistance of the glass product is to be improved: a CURABLE COMPOSITION may be spread over the glass surface In a sufficient thickness to secure a cured coating film of 0.5 μm or more. It is however preferable to form a cured coating film with a thickness of 2 to 200 μm, most preferably from 2 to 30 μm, in order to guarantee a sufficiently tough and adhesive film for the glass surface, and the original mechanical strength such as resistance to pressure, under exposure to alkaline hot water and/or hot water.

When a CURABLE COMPOSITION of the present invention is spread over, or impregnated in the glass after being dissolved in a solvent, an additional process step may be added, if required, to remove water or solvent with normal pressure, heat, or a vacuum.

In accordance with the knowledge of the applicants of the present invention, pretreatment to activate the CURABLE COMPOSITION of the present invention with heat or active energy ray will improve the adhesiveness of the cured resinous film to the glass surface and, at the same time, will improve the mechanical strength of the reinforced glass article in its resistance to pressure and impact, though it may be cured with active energy ray immediately after being spread over the glass surface, regardless of the presence or absence of water or solvent therein.

The water or solvent may be removed from a CURABLE COMPOSITION of the present invention during the activation step.

The CURABLE COMPOSITION spread over the glass surface may be activated by the heat left in the glass itself, by a newly generated hot wind, by heat generated by the oven into which it is placed, or by the aforementioned active energy ray.

An agent inhibiting curing by thermal polymerization may be added, if required, to a CURABLE COMPOSITION beforehand, to retard the curing of the CURABLE COMPOUND in the CURABLE COMPOSITION during the activation process.

If hot wind is used in the activation process, it is preferable to keep the temperature sufficiently low to prevent the thermal polymerization of the CURABLE COMPOUND in the CURABLE COMPOSITION. That is to say, a range of 40 to 120° C., or more preferably from 50° to 80° C., will provide the best results. The activation time should preferably be within a range of 10 sec to 1 hr.

It has been observed that when curing is effected subsequent to activation by the aid of active energy ray under constant conditions increasing to 60 sec. the activation time during which a CURABLE COMPOSITION is irradiated with a hot wind of 60° C., this will tend to increase the mechanical strength of the resin-coated glass article which is the final product.

When the activation is effected by the aid of active energy ray, it will preferably be different from the active energy ray used for the curing process. Far-infrared rays and microwaves are particularly preferable radiation types for the activation process.

An agent for deactivating active energy ray may be used as required in the activation process, to prevent the curing of a CURABLE COMPOUND during the process.

It has been observed that when curing is effected subsequent to activation by the aid of active energy ray under constant conditions, increasing the activation time during which a CURABLE COMPOSITION is irradiated with far-infrared rays emitted from a far-infrared ray source with a surface temperature of 400° C., this will tend to increase the mechanical strength of the resin-coated glass article which is the final product. Furthermore maximum strength will be attained in 5 sec. Thereafter, the strength of the final product will tend to remain when activation time is further increased.

During activation with the aid of far-infrared rays, the three major operating parameters that will affect the performance of the activation are the surface temperature of the far-infrared source, the distance between the ray-emitting surface and the irradiated object, and the irradiation time. It is therefore preferable to activate the CURABLE COMPOSITION two or more times, to optimize the conditions for each parameter.

Activation with the aid of active energy ray is to be preferred over all other methods for various reasons; reduced activation time to improve productivity, controlled partial evaporation, resulting in a higher degree of uniformity of the CURABLE COMPOSITION (particularly that spread over a glass article of complicated shape), controlled temperature increase on the glass surface preventing the degradation of the glass itself under heat, higher energy efficiency, and the compactness of the device which is used.

The aforementioned activation procedures are applicable, not only to a CURABLE COMPOSITION of the present invention, but also to various agents, such as a composition containing the conventional silane coupling agent and an active energy ray-curable compound such as essential components, paints, fiber treatment agents, adhesives, coupling agents, etc.

For example, they are applicable to the composition disclosed by the unexamined Japanese Patent Publication No. 1-201047, essentially consisting of a silane coupling agent, an active energy ray-curable compound and, if necessary, an organic solvent.

A variety of devices known to those skilled in the art may be used for the activation of polymerization of the curing process for a CURABLE COMPOSITION of the present invention. These include: a lamp for sterilization, a fluorescent lamp emitting ultraviolet rays, a carbon arc lamp, a xenon lamp, a high-voltage mercury lamp for copying, a medium- to high-voltage mercury lamp, a superhigh-voltage mercury lamp, an electrodeless lamp, a metal halide lamp, an ultraviolet ray emitting device using natural light or another light source, a ferrite device emitting electron beams by using a scanning or curtain accelerator path, and a ceramic device emitting a far-infrared ray.

The CURABLE COMPOSITION of the present invention can be readily cured with the aid of the aforementioned active energy ray or a device emitting the same. It is however preferable to irradiate ultraviolet rays in an inert gas atmosphere, consisting of nitrogen, for example, when a coating film of 1 μm or less is cured with ultraviolet rays, to improve the productivity of polymerization.

The conditions under which active energy ray can be used are not limited, so long as the energy level and irradiation time are sufficient to cure the CURABLE COMPOSITION. The irradiation time should preferably be within a range of 1 to 30 sec.

It may be possible to polymerize and cure the CURABLE COMPOSITION when heat is used as the polymerization initiator, either in the absence of a catalyst or in the presence of the relevant polymerization initiator, such as azobisisobutylonitrile, benzoylperoxide, or methylethylketoneperoxide-cobalt naphthenate.

The CURABLE COMPOSITION of the present invention may be mixed with, as required, one or more of a variety of agents, such as thermal polymerization inhibitors, synthetic resins, light stabilizers, far-infrared absorbents, infrared absorbents, ultraviolet absorbents, pigments, dyes, defoaming agents, leveling agents and surface-active agents, as well as the aforementioned polymerization initiator.

The present invention also provides a method for greatly improving the mechanical strength, such as resistance to pressure and impact, of glass, and enables the reduction of the thickness of glass while keeping a mechanical strength that is equivalent to, or higher than, that of unreinforced glass. Therefore, it reduces raw material costs and/or the weight of glass containers. It also opens up the opportunity for a wider application of glass articles; for example, the reinforced glass containers have sufficient strength to allow them to be handled safely in vending machines for refreshments, in which conventional glass containers are not extensively used.

In general, glass containers of this type are chemically treated in various ways while they are hot in order to increase their mechanical strength. Furthermore, they are coated with relevant agents such as surface-active agents, after being cooled slowly, to prevent possible surface damage caused by impact or friction, which may result in a diminished mechanical strength. These steps can be saved, when the present invention's method for coating CURABLE COMPOSITION is applied, thereby improving productivity and lowering the production costs. The other advantages offered by the method of the present invention for improving the mechanical strength of glass containers are its economical advantages, such as improved quality and production yield; and its ability to improve the resistance of glass containers to pressure and impact to a certain desired level, unlike the conventional method, which tends to produce some defective products lacking in mechanical strength. Yet another advantage of the method of the present invention is that it can improve the mechanical strength of glass containers to reprocess mechanically degraded, returnable glass bottles.

The CURABLE COMPOSITION of the present invention is normally liquid, and has a viscosity that can be freely adjusted with a relevant solvent. As such, it is applicable to glass articles of any shape, beginning with glass bottles, and it allows active energy ray such as ultraviolet rays to penetrate completely, regardless of the shapes over which it is spread. Therefore, the use of the CURABLE COMPOSITION in the present invention will improve the glass article's resistance to pressure and impact, regardless of size, thickness and shape, and regardless of whether it is in the shape of a film, plate, rod, sphere, line or a combination thereof.

Furthermore, the present inventions's method to improve mechanical strength enables it to provide flint glass containers of various colors, since the CURABLE COMPOSITION of the present invention can be mixed with a pigment or dye. The conventional process requires, when the color is switched, some time before one color can be switched to another, causing a product loss. Such a problem can be solved with the present invention's method.

EXAMPLES

The present invention is illustrated more clearly through the following examples. It is to be understood that these examples are for illustration, but are not limiting for the present invention. "Part" used for expressing the concentration of a component should be understood to mean "weight part."

<EXAMPLE 1 AND COMPARATIVE EXAMPLES 1 through 3>

Commercial plates of hard glass (70×150×2 mm) were placed in a 5 wt % aqueous solution of sodium hydroxide for 1 h, washed with distilled water, and dried at 60° C. for 5 min in a hot wind-circulation oven. They were then cut using a diamond cutter to provide them with grooves, and coated with various compositions, including the CURABLE COMPOSITIONS of the present invention (Table 1). Each plate was dried at 60° C. for 1 min in the same oven, kept hot, and were then cured by irradiation with ultraviolet ray for 30 sec by a high-voltage mercury lamp (80W/cm) as soon as it was withdrawn from the oven. The cured film was 3 μm thick.

The 3-point fracture strength of each glass sample thus prepared was tested. The results are provided In Table 1 (n=20).

The 3-point fracture strength test was carried out under the following conditions:

<3-point fracture strength test>

The glass sample coated with a CURABLE COMPOSITION was tested by a bending-strength tester (Autograph AG-5000C, Shimazu) with a span distance of 50 mm and a head speed of 0.5 mm/min, with the coated surface directed downward. The results are given in Table 1, and are relative to those of the blank sample, which was also grooved, but not coated.

The component designations in the tables providing the results correspond to those of the compounds described in the specifications, and the marks (M), (A) and (MEK) that follow these designations denote methacrylate, acrylate and methylethylketone.

In addition, the "as-prepared" condition described in Table 1 denotes the composition prepared at 25° C. and 60% RH, while "after 48 hr" means that the above composition was kept for 48 hr.

TABLE 1

| EXAMPLE AND COMPARATIVE EXAMPLES | Components of the CURABLE COMPOSITIONS (part) | | 3-point bending fracture strength (relative level) | |
|---|---|---|---|---|
| | | | As-prepared | After 48 hr |
| EXAMPLE 1 | II-37 (A) | 40 | | |
| | II-46 (A) | 10 | | |
| | II-82 (A) | 10 | | |
| | II-17 (A) | 15 | | |
| | II-68 (A) | 15.9 | 7.8 | 7.5 |
| | II-20 (A) | 5 | | |
| | ACRONAL 4F | 0.1 | | |
| | V-8 | 4 | | |
| | I-13 | 5 | | |
| | p-toluene sulfonic acid · H₂O | 0.05 | | |
| | Water | 1.36 | | |
| COMPARATIVE EXAMPLE 1 | The composition of EXAMPLE 1, except for 1.36 parts of water was removed. | | 7.7 | 1.3 |
| COMPARATIVE EXAMPLE 2 | The composition of EXAMPLE 1, except for 1.36 parts of water was replaced by 1.36 parts of methylethyl-ketone. | | 7.0 | 1.3 |
| COMPARATIVE EXAMPLE 3 | The composition of EXAMPLE 1, except for 1.36 parts of water was replaced by 300 parts of methylethyl-ketone. | | 7.3 | 2.1 |

<EXAMPLES 2 through 4 and COMPARATIVE EXAMPLES 4 through 6>

The same procedure as used for EXAMPLE 1 was repeated,in preparing the coated glass samples coating the glass plates with CURABLE COMPOSITION as shown in Table 2, (the thickness of each cured film was 3 μm).

Each glass sample thus prepared was tested for 3-point fracture strength (n=20), following the procedure described in EXAMPLE 1, and for resistance to hot water. Table 2 provides these results.

The test for resistance to hot water was carried out under the following conditions:

<Test for resistance to hot water>

Each glass plate sample coated with the CURABLE COMPOSITION was placed in hot water and kept at 80° C. for 6 min. Each sample was then rubbed with a 2H pencil, to determine the time until the coating film was exfoliated (exfoliation time). In addition, the coated glass sample was tested with the 3-point fracture strength (n=20) test after having been placed in 80° C. hot water for 1 hr.

Table 2 provides the results, where "after 192 hr" denotes a composition prepared at 25° C. and 60% RH, which was maintained for 192 hr under the above conditions.

TABLE 2

| EXAMPLES AND COMPARATIVE EXAMPLES | Components of CURABLE COMPONENTS (part) | | 3-point bending fracture strength (relative level) | | | Test results for resistance to hot water | | | | | |
|---|---|---|---|---|---|---|---|---|---|---|---|
| | | | | | | 3-point bending fracture strength (relative level) | | | Exfoliation time (min) | | |
| | | | As-prepared | After 48 hr | After 192 hr | As-prepared | After 48 hr | After 192 hr | As-prepared | After 48 hr | After 192 hr |
| EXAMPLE 2 | II-37 (A) | 40 | 8.0 | 8.0 | 8.0 | 8.0 | 8.0 | 8.0 | >3000 | >3000 | >3000 |
| | II-46 (A) | 10 | | | | | | | | | |
| | II-82 (A) | 10 | | | | | | | | | |
| | II-17 (A) | 15 | | | | | | | | | |
| | II-68 (A) | 15.9 | | | | | | | | | |
| | II-107 (A) | 5 | | | | | | | | | |
| | ACRONAL 4F | 0.1 | | | | | | | | | |
| | V-8 | 4 | | | | | | | | | |
| | I-13 | 5 | | | | | | | | | |
| | p-toluene sulfonic acid.H$_2$O | 0.05 | | | | | | | | | |
| | MEK | 300 | | | | | | | | | |
| | Water | 15 | | | | | | | | | |
| COMPARATIVE EXAMPLE 4 | The composition of EXAMPLE 1, except that 15 parts of water was removed. | | 7.3 | 2.1 | 1.6 | 7.3 | 1.3 | 1.0 | >3000 | 90 | >60 |
| EXAMPLE 3 | II-37 (A) | 40 | 8.3 | 8.3 | 8.0 | 8.3 | 8.3 | 8.0 | >3000 | >3000 | >3000 |
| | II-46 (A) | 10 | | | | | | | | | |
| | II-64 (A) | 15 | | | | | | | | | |
| | II-77 (A) | 10 | | | | | | | | | |
| | II-17 (A) | 15 | | | | | | | | | |
| | II-107 (A) | 10 | | | | | | | | | |
| | ACRONAL 4F | 0.1 | | | | | | | | | |
| | V-8 | 4 | | | | | | | | | |
| | I-13 | 5 | | | | | | | | | |
| | p-toluene sulfonic acid.H$_2$O | 0.05 | | | | | | | | | |
| | MEK | 300 | | | | | | | | | |
| | Water | 15 | | | | | | | | | |
| COMPARATIVE EXAMPLE 5 | The composition of EXAMPLE 2, except that 15 parts of water was removed. | | 7.9 | 2.2 | 1.7 | 7.9 | 1.7 | 1.0 | >3000 | 90 | >60 |
| EXAMPLE 4 | II-16 (A) | 40 | 6.9 | 6.9 | 6.9 | 6.9 | 6.9 | 6.9 | >3000 | >3000 | >3000 |
| | II-12 (A) | 10 | | | | | | | | | |
| | II-9 (A) | 10 | | | | | | | | | |
| | II-17 (A) | 15 | | | | | | | | | |
| | II-19 (A) | 15.9 | | | | | | | | | |
| | II-107 (A) | 5 | | | | | | | | | |
| | ACRONAL 4F | 0.1 | | | | | | | | | |
| | V-8 | 4 | | | | | | | | | |
| | I-13 | 5 | | | | | | | | | |
| | p-toluene sulfonic acid.H$_2$O | 0.05 | | | | | | | | | |
| | MEK | 300 | | | | | | | | | |
| | Water | 15 | | | | | | | | | |
| COMPARATIVE EXAMPLE 6 | The composition of EXAMPLE 3, except that 15 parts of water was removed. | | 5.8 | 1.6 | 1.4 | 5.3 | 1.1 | 1.0 | 600 | 60 | 60 |

<EXAMPLES 5 through 7>

The same procedure as used for EXAMPLE 1 was repeated to prepare glass plate samples coated with the CURABLE COMPOSITIONS used in EXAMPLES 2 through 4, except that the step in which each sample was dried at 60° C. for 1 min and kept under the same conditions in the oven was replaced by the following step, in which each sample was irradiated with far-infrared rays for 5 sec by a ceramic-coated far-infrared ray emission apparatus, the irradiation surface of which was kept at 400° C. and placed 10 cm from the coated surface of the glass plate (Teikoku Piston Ring; area of one irradiation surface—13 cm×13 cm, operating at 200 V and 0.4 kW, the number of irradiation surfaces adjusted in a way that would keep the total irradiation surface area at least 3 times the size of an irradiation surface area). The sample procedure as used for EXAMPLES 1 and 2 was repeated to test each glass plate sample. Table 3 provides these results.

TABLE 3

| EXAMPLES AND COMPARATIVE EXAMPLES | Components of CURABLE COMPONENTS (part) | 3-point bending fracture strength (relative level) | | | Test results for resistance to hot water | | | | | |
|---|---|---|---|---|---|---|---|---|---|---|
| | | | | | 3-point bending fracture strength (relative level) | | | Exfoliation time (min) | | |
| | | As-prepared | After 48 hr | After 192 hr | As-prepared | After 48 hr | After 192 hr | As-prepared | After 48 hr | After 192 hr |
| EXAMPLE 5 | The CURABLE COMPOSITION used for EXAMPLE 2 | 8.5 | 8.5 | 8.3 | 8.5 | 8.5 | 8.3 | >3000 | >3000 | >3000 |
| EXAMPLE 6 | The CURABLE COMPOSITION used for EXAMPLE 3 | 8.9 | 8.9 | 8.8 | 8.9 | 8.9 | 8.8 | >3000 | >3000 | >3000 |
| EXAMPLE 7 | The CURABLE COMPOSITION used for EXAMPLE 4 | 7.9 | 7.9 | 7.8 | 7.9 | 7.9 | 7.8 | >3000 | >3000 | >3000 |

<EXAMPLE 8>

Glass bottles (treated by hot-end coating (H/C) but not by cold-end coating (C/C), produced by Yamamura Glass as an assignee of the present invention (150 gr in weight and 300 ml in volume)) were coated with the "after 192 hr" CURABLE COMPOSITION used in EXAMPLE 2 by the dipping process. These bottles were immediately dried at 60° C. for 1 min in the oven, and then passed through an ultraviolet curing oven (with two high-voltage mercury lamps operating at 160 W/cm) for 30 sec. A total of 50 bottles were thus prepared, and each, coated with the 3 µm thick cured film was tested for resistance to pressure (JIS-S-2302 for resistance to internal pressure of bottles for carbonated beverages, where the resistance was regarded to be 900 psi for those that were not broken at a pressure of 900 psi of water contained therein), and resistance to impact (JIS-S-2303 for resistance to mechanical impact by bottles for carbonated beverages). Table 3a shows the minimum and average resistance to pressure and impact of a total of 50 bottles.

<COMPARATIVE EXAMPLES 7>

The same procedure as used for EXAMPLE 8 was repeated, except that the as-prepared CURABLE COMPOSITION for COMPARATIVE EXAMPLE 4 was used, to prepare a total of 50 coated bottle samples. Table 3a provides these results.

The same test procedure as used for EXAMPLE 8 was repeated for the coated glass bottle samples, including those not H/C-treated, those C/C-treated, and those neither H/C-treated nor C/C-treated. The results showed that their resistance to pressure and impacts similarly improved.

<COMPARATIVE EXAMPLE 8>

The same test procedure as used for EXAMPLE 7 was repeated for a total of 24 uncoated glass bottles (control bottles). These results are also shown in Table 3a.

TABLE 3a

| EXAMPLE and COMPARATIVE EXAMPLES | | Average | Minimum |
|---|---|---|---|
| EXAMPLE 8 | Resistance to pressure (psi) | 812 | 630 |
| | Resistance to impacts (kg · cm) | 11.3 | 2.3 |
| COMPARATIVE EXAMPLE 7 | Resistance to pressure (psi) | 761 | 576 |
| | Resistance to impacts (kg · cm) | 10.8 | 3.6 |

TABLE 3a-continued

| EXAMPLE and COMPARATIVE EXAMPLES | | Average | Minimum |
|---|---|---|---|
| COMPARATIVE EXAMPLE 8 | Resistance to pressure (psi) | 511 | 300 |
| | Resistance to impacts (kg · cm) | 8.4 | 2.0 |

<EXAMPLE 9>

The same procedure as used for EXAMPLE 8 was repeated to prepare a total of 50 glass bottle samples, except that the step in which each sample was dried at 60° C. for 1 min and kept under the same conditions in the oven was replaced by the following step, in which each sample was irradiated with far-infrared rays for 5 sec by a ceramic-coated far-infrared ray emission apparatus, the irradiation surface of which was kept at 400° C. and placed 10 cm from the coated surface of the sample. The same test procedure was repeated for these samples. Table 4 provides these results.

TABLE 4

| | | Average | Minimum |
|---|---|---|---|
| EXAMPLE 9 | Resistance to pressure (psi) | 884 | 741 |
| | Resistance to impact (kg · cm) | 11.8 | 4.2 |

The same test procedure was also repeated for the coated glass bottle samples, including those not H/C-treated, those C/C-treated, and those neither H/C-treated nor C/C-treated. The results showed that their resistance to pressure and impact similarly improved.

<EXAMPLE 10>

The same procedure as used for EXAMPLE 1 was repeated to coat a glass plate with the CURABLE COMPOSITION shown in Table 4. The coated plate was irradiated with 5 Mrad of electron beams (acceleration voltage: 300 kV, amperage: 25 mA, dose rate: 30 Mrad/sec, oxygen concentration in the atmosphere: 0.1%), after having been dried at 60° C. for 1 min in the oven and kept at that same temperature, to cure the coating film. The cured film was 3 µm thick.

The same procedure as used for EXAMPLE 1 was repeated to test the 3-point bending fracture strength of the glass plate sample. Table 5 shows these results.

TABLE 5

| EXAMPLE fracture | Components of the CURABLE COMPOSITIONS (part) | | 3-point bending strength (relative level) | |
|---|---|---|---|---|
| | | | As-prepared | After 48 hr |
| EXAMPLE 10 | II-103 (A) | 50 | | |
| | II-125 (M) | 25 | | |
| | II-122 (M) | 20 | | |
| | I-13 | 5 | 4.4 | 4.4 |
| | p-toluene sulfonic acid - H$_2$O | 0.055 | | |
| | MEK | 300 | | |
| | Water | 15 | | |

<EXAMPLE 11>

Glass bottles kept at 60°±10° C. (treated by hot-end coating only), produced by Yamamura Glass as an assignee of the present invention (150 gr in weight and 300 ml in volume) were coated by the dipping precess with an "after 192 hr" CURABLE COMPOSITION used in EXAMPLE 2 dipping process. Then they were immediately passed through an ultraviolet curing oven (with two high-voltage mercury lamps operating at 160 W/cm) for 30 sec.

A total of 50 bottles were thus prepared, each coated with the 3 μm thick cured film, and tested for resistance to pressure (JIS-S-2302 for resistance to internal pressure of carbonated beverage bottles, where the resistance was regarded to be 900 psi for those not broken at a pressure of 900 psi of water contained therein), and resistance to impact (JIS-S-2303 for resistance to mechanical impact of carbonated beverage bottles). The minimum and average resistance to pressure and impact for all 50 bottles are given in Table 6.

TABLE 6

| EXAMPLE and COMPARATIVE EXAMPLES | | Average | Minimum |
|---|---|---|---|
| EXAMPLE 11 | Resistance to pressure (psi) | 813 | 631 |
| | Resistance to impact (kg · cm) | 11.4 | 2.4 |

What is claimed is:

1. An active energy ray-curable composition comprising a silane coupling agent, an active energy ray-curable compound and 0.5 to 80 parts by weight of water per 100 parts by weight of the composition, wherein the active energy ray-curable compound comprises at least two acryloyl group-containing compounds wherein the acryloyl group is fluoroacryloyl, methacryloyl or acryloyl.

2. An active energy ray-curable composition according to claim 1, which further comprises an organic solvent.

3. An active energy ray-curable composition according to claim 1, wherein the active energy ray-curable compound has an acid number of 0.01 to 100.

4. An active energy ray-curable composition according to claim 1, wherein the active energy ray-curable composition additionally comprises an oil-soluble, fluorine-base surface-active agent.

5. An active energy ray-curable composition comprising a silane coupling agent, an active energy ray-curable compound, and water, wherein the active energy ray-curable compound is at least one of a multi-valent (meth)acrylate and an epoxy-modified (meth)acrylate, wherein the multi-valent (meth)acrylate has at least two (meth)acrylic acid molecules bonded to multi-valent alcohol, and wherein the epoxy-modified (meth)acrylate has at least two (meth) acrylic acid molecules bonded to an epoxy group of an epoxy compound having, in its molecular structure, at least two separate epoxy groups.

6. An active energy ray-curable composition according to claim 5, which further comprises an organic solvent.

7. An active energy ray-curable composition according to claim 5, which contains 0.5 to 80 parts by weight of water per 100 parts by weight of the composition.

8. An active energy ray-curable composition according to claim 5, wherein the active energy ray-curable compound has an acid number of 0.01 to 100.

9. An active energy ray-curable composition according to claim 5, wherein the active energy ray-curable composition additionally comprises an oil-soluble, fluorine-base surface-active agent.

* * * * *